Nov. 24, 1942.     H. E. RUPP     2,303,232
SHAFT SEAL
Original Filed March 29, 1940     2 Sheets-Sheet 1

Inventor
HERBERT E. RUPP.

By Dowell & Dowell
Attorneys.

Nov. 24, 1942.　　　　　　H. E. RUPP　　　　　　2,303,232
SHAFT SEAL
Original Filed March 29, 1940　　2 Sheets-Sheet 2

Inventor
HERBERT E. RUPP.
By Dowell & Dowell,
Attorneys.

Patented Nov. 24, 1942

2,303,232

UNITED STATES PATENT OFFICE 2,303,232

SHAFT SEAL

Herbert E. Rupp, Springfield Township, Richland County, Ohio

Original application March 29, 1940, Serial No. 326,743. Divided and this application January 15, 1941, Serial No. 374,555

9 Claims. (Cl. 286—7)

This invention, for which the present application is filed as a division of my application for Centrifugal pumps filed March 29, 1940, Serial No. 326,743, relates to constructions for use in centrifugal pumps in connection with the sealing of the impeller shafts and installation and removability of the shaft sealing means; the invention considered in the aspect of an improvement in shaft seals being also of general applicability to the sealing of rotary shafts against discharge of fluid to or from chambers through the shaft housings or wall passages through which the shafts enter such chambers. Among other objects the invention is intended to provide an improved manner and means of applying the shaft packing; to provide practicable shaft sealing means of such character as to permit installation thereof from inside the pump chamber or other chamber which the shaft enters; and to provide shaft sealing means which can be easily and conveniently installed and removed by hand. Further objects more or less ancillary to the foregoing will appear from the following description with reference to an illustrative embodiment of the invention shown in the accompanying drawings, wherein such embodiment is represented as applied, for example, to a centrifugal pump of the type and construction disclosed in said application Serial No. 326,743. The invention is not dependent upon the type or construction of pump selected for illustration, the impeller shaft of which may be considered as typifying the driving shaft of any centrifugal pump or other machine or apparatus to which a shaft seal embodying the invention may be applied.

Figure 1:
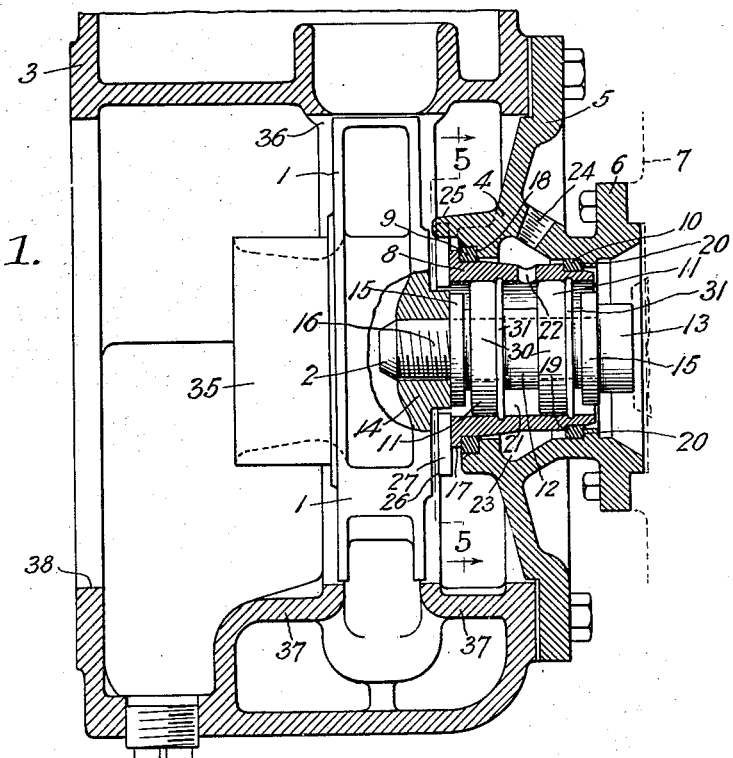
Fig. 1 is a vertical sectional view, with parts in elevation, of a centrifugal pump having shaft sealing means embodying the invention; only so much of the pump structure being shown as is convenient for explanation of the invention and the manner of installing and removing the shaft seal.

As represented in the drawings, the impeller 1 of a centrifugal pump is fixed to the fore end of a motor-driven shaft 2 which enters the pump casing 3 through a housing 4 in its back wall, the shaft being supported and driven externally of the pump casing. In the particular construction illustrated, the back wall of the pump casing includes a closure plate 5 marginally bolted to the main body of the casing, with suitable interposed gasketing, said back closure plate being formed with the shaft housing 4 and with a flange 6 to which is bolted the frame 7 (only partially indicated by dotted lines in Figs. 1 and 4) of a motor whose driven shaft is utilized as the pump impeller shaft.

The shaft is sealed in its housing by suitable packing in a retainer therefor comprising a removably mounted sleeve 8 insertible from inside the pump casing into said housing and seating by rearward thrust against a sealing ring or rings arranged to be pressed between opposing parts of said sleeve and housing or back wall of which said housing is a part. Sealing rings or gaskets between the retainer sleeve 8 and housing 4 are designated in the drawings by the numerals 9 and 10. For convenience in installation these rings are carried by the retainer sleeve and insertible therewith into the housing. Packing retained in the retainer sleeve 8 is exemplified by a pair of annular composite type packing units 11 encircling an inner sleeve 12 fitted on and rotatable with the shaft and sealed in the retainer sleeve 8 by said packing. Said inner sleeve 12 has a slip fit on the impeller shaft but is made fast thereto in a manner to prevent leakage of fluid from the pump casing between the shaft and said sleeve 12 by suitable means, preferably by clamping said sleeve 12 between the shaft shoulder 13 and the impeller 14, with washers or gaskets 15 between the clamped elements. A tight clamping of the parts is easily maintained by fastening the impeller hub to the shaft by screw threaded engagement therewith, as indicated at 16, with the screw threads running in a direction to keep the impeller screwed home by the driving of the impeller by the shaft. That is to say, if the impeller as viewed from the back rotates in a clockwise direction, the screw threads should be right handed, and if the rotation is in the opposite direction the screw threads should be left handed. Thus the impeller hub is screwed on the shaft in a direction opposite to that in which it is rotated by the shaft, so that the driving of the impeller tightens it on the shaft and keeps it screwed home, as indicated in patent to Gorman and Rupp No. 2,104,355 of January 4, 1938.

Figure 4:
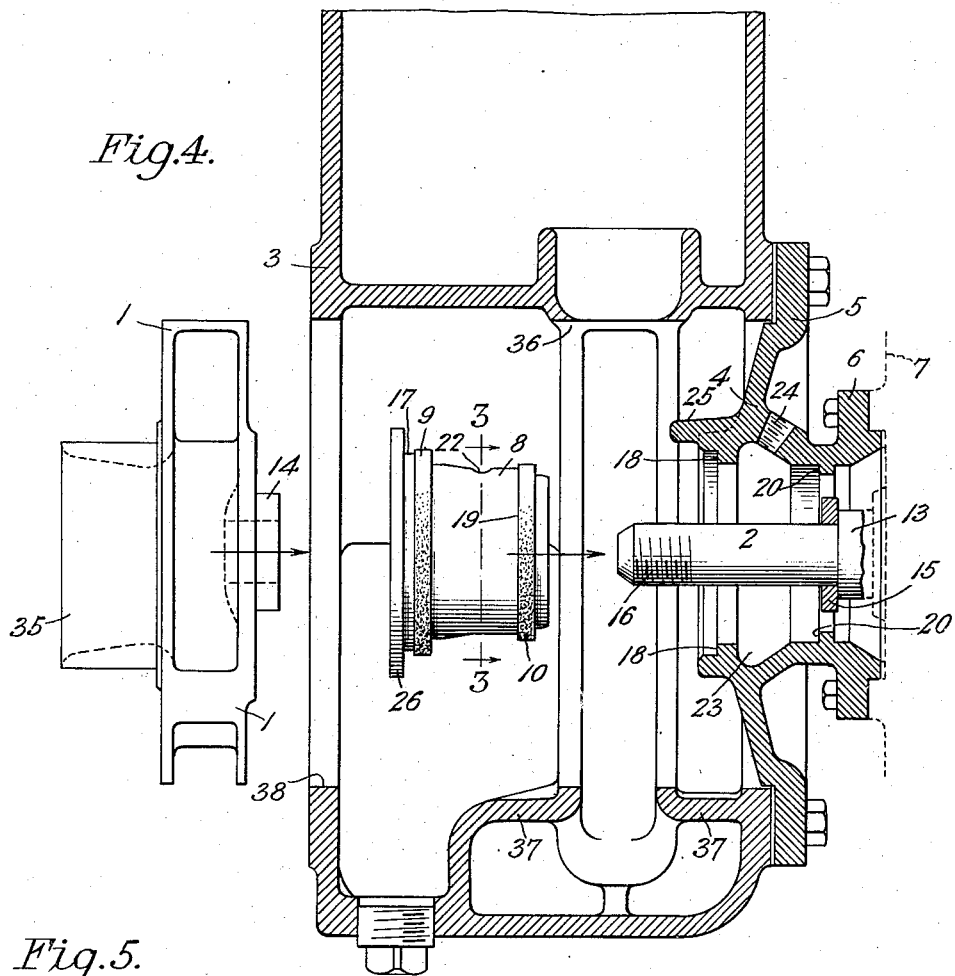
Fig. 4 is a sectional view of the structure shown in Fig. 1 with parts disassembled and indicating the order of their assembly.

The retainer sleeve 8 with its sealing rings 9 and 10 and the shaft packing 11 therein retained, together with the shaft sleeve 12 sealed in said retainer sleeve by said packing, constitutes a unit or assembly which as such can be easily installed from inside the pump casing by inserting it into the shaft housing and pushing the sleeve 12 rearwardly, with the effect of pressing the sealing rings 9 and 10 between the shoulders 17 and 19 of the retainer sleeve and the shoulders 18 and 20 of the shaft housing. After insertion of such assembly, the impeller shaft can be inserted therethrough and clamped to the shaft sleeve 12 by attaching the impeller; or, if the impeller shaft is already in position before installation of the seal, as illustrated in Fig. 4, the assembly comprising the retainer sleeve 8, its sealing rings, retained packing 11 and shaft sleeve 12 can be slipped over the shaft and into the shaft housing, whereupon the impeller can be attached, as will be clearly understood from Fig. 4.

In the preferred embodiment of the invention shown in the drawings, the space between the packing units 11 constitutes an oil chamber 21 for lubricating the rotating shaft sleeve 12 in the contacting elements of the packing units, oil being admitted to said chamber through the hole 22 from the oil chamber 23 to which oil is introduced through a filling opening normally closed by the screw plug 24. The sleeve shoulder 17, of less elevation than the radial thickness of the sealing ring 9, abuts against the fore side of said ring which abuts against the housing shoulder 18 formed by rabbeting the fore end of said housing. Said sealing ring 9 prevents leakage of fluid from the pump casing around the retainer sleeve or leakage of oil from the chamber 23 into the pump casing, while the sealing ring 10 prevents exudance of oil from the rear end of the housing. If desired, the retainer sleeve 8 may fit the bore of the shaft housing, and in that case the rear sealing ring 10 may be simply fitted in an annular groove in said sleeve with the outer surface of the ring contacting with the interior surface of the housing 4. However it is preferred to have both sealing rings arranged to be pressed between opposing parts of the retainer sleeve and housing 4. Therefore, as shown in the drawings, the sealing ring 10 is fitted on a part of the retainer sleeve of reduced diameter, between the sleeve shoulder 19 and the housing shoulder 20 formed by an internal flange at the rear or outer end of said housing. With this arrangement, the retainer sleeve is centered in the housing by the sealing rings. Behind both of the sealing rings the retainer ring is shown tapered to facilitate its insertion. By forming the sealing rings with cylindrical exterior and interior surfaces fitting confronting cylindrical surfaces of the retainer sleeve and shaft housing 4, the retainer sleeve when inserted within the housing is retained therein by the sealing rings. Pressure or action of the liquid in the pump casing against the flanged head of the retainer sleeve forces it rearwardly, tending to keep it firmly seated with the sealing rings pressed between the sleeve shoulders 17 and 19 and the housing shoulders 18 and 20. Thus the effectiveness of the seal is increased by the force of the liquid against it; the greater the inside pressure, the better and more positive the sealing will be.

Figure 5:
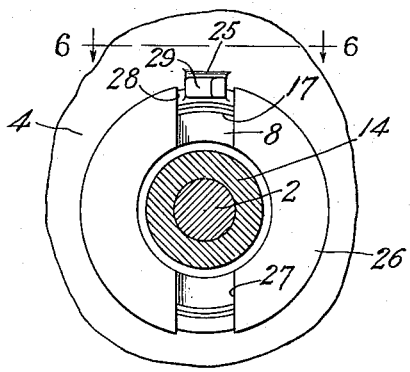
Fig. 5 is a section taken on the line 5—5 of Fig. 1 looking in the direction of the arrows, showing in elevation the fore or inner end of the shaft housing and packing retainer therein.
Figure 6:
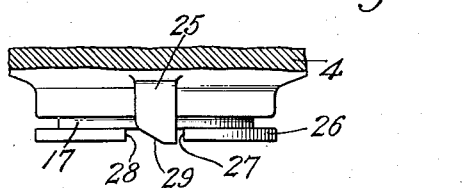
Fig. 6 is a horizontal section on the line 6—6 of Fig. 5, looking down and showing in plan view the said fore end of the shaft housing and corresponding end of the packing retainer.

The retainer sleeve 8 is held against turning in the direction of rotation of the impeller by interengaging means between said sleeve and the shaft housing 4, exemplified by a lug 25 on said housing extending into a notch in the flange 26 of the retainer sleeve. Said flange 26 is shown formed with a diametric slot 27 providing two notches either of which may be utilized for engagement by the lug 25. When the impeller is removed, exposing the retainer sleeve from the front as shown in Fig. 5, said retainer sleeve can be turned in a direction opposite to the direction of rotation of the impeller to force the wall 28 of the notch against a beveled surface 29 on the lug 25, so that by the riding of said wall 28 against said beveled surface the retainer sleeve will be drawn slightly forward, thus loosening it for easy withdrawal. The said lug 25 thus serves both as a lock and as an extracting wedge for the retainer sleeve. It will be apparent that, when the impeller is removed from its shaft, the retainer sleeve 8 together with the packing therein and the shaft sleeve 12 can be easily removed by hand, ordinarily without the use of tools. If however the retainer sleeve should become stuck in the shaft housing so tightly that it cannot be easily turned by hand against the beveled surface 29 of the lug 25, it can be readily turned by means of a spanner wrench or any suitable makeshift tool inserted in the diametric slot 27 of the flange 26.

Figure 2:
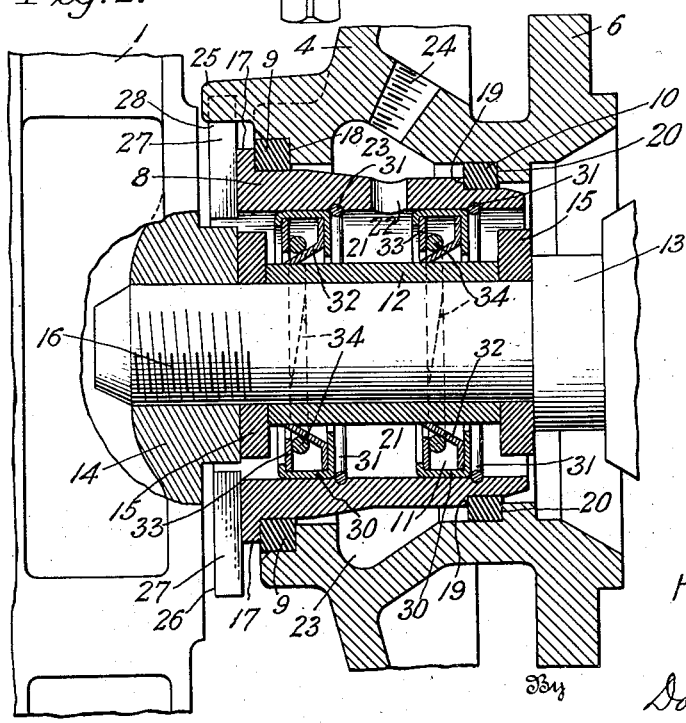
Fig. 2 is a sectional view on a larger scale of a portion of the structure shown in Fig. 1, namely the portion embodying the shaft seal.
Figure 3:
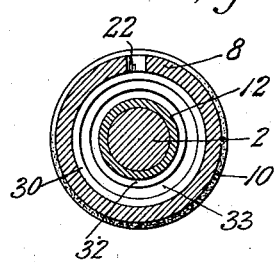
Fig. 3 is a cross section of the shaft and surrounding means for sealing it in its inner housing, the section being taken on the line 3—3 of Fig. 4 looking in the direction of the arrows.

The packing units 11 may be considered as typifying packing of any appropriate character or construction between the retainer sleeve 8 and shaft sleeve 12 for seating the latter in the former. The particular packing unit shown comprises housing rings 30 and other rings associated therewith. The housing rings 30 are sheet metal stampings in the form of short sleeves having inturned end flanges, these sleeves being tightly fitted in the retainer sleeve and abutting retainer rings 31 at their rear ends, said rings 31 being wire rings sprung into annular grooves in the retainer sleeve. These retainer rings 31 prevent rearward displacement of the housing rings 30 by liquid pressure and seal the housing rings against discharge of fluid therearound. Enclosed in the housing rings 30 are rings 32 of rubber, leather, fiber or other suitable gasket material having flat rim portions bearing against the rear flanges of the housing rings 30 and having frusto-conical portions extending forwardly or toward the impeller and hugging the shaft sleeve 12, the fore ends of said frusto-conical portions being beveled as shown in Fig. 2 for close contact with the shaft sleeve 12. Also enclosed in the housing rings 30 are the flat rings 33 abutting against the fore end flanges of said housing rings. Contractile rings 34 which may be split rings of spring wire are arranged around said frusto-conical portions of said rings 32, bearing thereagainst and against the rings 33, the contractile tendency of the rings 34 contracting said frusto-conical portions of the rubber rings around the shaft sleeve 12 and forcing the flat rings 33 against the inturned flanges at the fore ends of the housing rings 31. It will be observed that pressure of the liquid against the frusto-conical portions of the rubber rings 32 tends to force them still more closely around the shaft sleeve, and that discharge of liquid into or around the packing units is prevented or effectively resisted by sealing contact of the housing rings in the retainer sleeve 8 and against the retainer rings 31 and by sealing contact between the contractile rings 34 and rings 32 and 33, sealing contact of the rings 33 against the fore end flanges of the rings 30 and sealing contact of the flat rim portions of the rubber rings 32 with the rear end flanges of the housing rings 30. The packing units shown are of very simple and inexpensive construction and in practice have proved effective. They are easily installed by pressing them into the retainer sleeve against the retainer rings 31 and inserting the shaft sleeve 12 therethrough. The several rings being in frictional contact and mounted in a stationary housing or element represented by the retainer sleeve 8, the tendency of the rings is to remain stationary; thus minimizing frictional contact between relatively rotating parts, i. e. between the shaft sleeve 12 and the beveled fore ends of the frusto-conical parts of the rubber rings 32. However there may be relative slippage of elements of the housing units or of such units in the retainer sleeve 8, the latter however being held against turning in the direction of the rotation of the impeller as already explained.

The retainer sleeve 8 may be considered as an inner housing removably mounted in an outer housing, namely in the housing 4. Also the shaft sleeve 12, clamped to and rotating with the shaft, may be considered as representing a shaft part sealed by the packing in the housing element in which the packing is arranged. The employment of the sleeve 12 having a slip fit on the shaft is of great advantage for convenience in installation and removal of the shaft packing in an assembly through which the shaft can be slipped. However it is contemplated that in some embodiments of features or subjects-matter of the invention the sleeve 12 may be omitted and the impeller shaft directly hugged by the packing units, through which the shaft may be inserted just as in the construction shown in the drawings the shaft sleeve is inserted.

In explanation of the particular pump structure shown in the drawings, the impeller 1 is shown as a closed type impeller having a tubular extension 35 to form a running joint with an intake pipe (not shown) for intake of fluid into the center of the impeller. The impeller rotates in an annular housing 36 providing around the periphery of the impeller passages through which fluid discharges from the impeller into a surrounding liquid chamber provided by the pump casing 3. The webs 37 supporting said impeller housing in the pump chamber do not completely partition the chamber, the liquid space of which above the impeller housing is in communication with the spaces in the casing around the periphery of the housing and in opposite sides of the impeller, so that, in the illustrative construction, the space behind the impeller is filled with liquid tending to discharge around the impeller shaft. For access to the interior of the pump from the front, for installing the shaft seal and the impeller, the pump casing is shown having a front opening 38 through which the shaft seal and impeller can be introduced as shown in Fig. 4, and through which these parts can be withdrawn when it is desired to inspect the shaft seal or to remove worn elements of the packing. The front opening 38 of the pump casing is of course to be closed by a front closure plate (not shown) through which plate extends the intake pipe (not shown) for connection with the suction line of the pump and with the tubular extension 35 of the impeller. While the shaft seal and impeller will ordinarily be installed in the manner indicated in Fig. 4, it is also possible in the illustrative structure to remove the back plate 5 and to withdraw therewith the shaft seal and impeller, after which the impeller can be detached from the shaft and the seal can be withdrawn from the housing 4. Conversely, the seal can be mounted in the back plate around the shaft and the impeller affixed thereto before application of the back plate to the pump casing, and the whole assembly comprising the back plate with attached motor, shaft, seal and impeller can be installed by applying the back plate and bolting it to the main body of the pump casing.

I claim as my invention:

1. In combination with an apertured housing, a rotatable shaft extending into the housing, a retainer carrying a shaft packing and mounted in said aperture, said retainer and the retained packing being applicable in place from inside the housing, said retainer seating outwardly against the wall of the housing and sealed against discharge of liquid therearound through said wall, said wall having means coactive with said retainer to prevent rotation thereof in one direction of rotation of the shaft and to cause displacement thereof in a direction for its removal by turning the retainer in a direction opposite to that of the aforesaid rotation of the shaft.

2. In combination with an apertured housing, a rotatable shaft extending into said housing, a packing retainer comprising a sleeve removably mounted in said aperture in said housing and insertible thereinto from the inside of the housing, sealing rings fitted between said sleeve and the walls of said aperture, said rings being fitted between opposing shoulders of the sleeve and aperture, said sleeve seating in the housing in outward direction and having a head flange which by pressure and action of liquid within the housing constitutes the sole means for holding the sleeve seated, and packing means within and retained by said sleeve.

3. In combination with an apertured housing, a shaft entering said housing, a packing retainer comprising a sleeve removably mounted in said aperture and insertible thereinto from the inside of the housing, means sealing said sleeve in said aperture, said sleeve seating in the housing in outward direction and having a head flange which by pressure and action of liquid within the housing holds the sleeve seated, and shaft packing means within and retained by said sleeve, said housing having an interior lug and said flange having a notch engageable by said lug to prevent rotation of said sleeve in one direction of rotation of the shaft, said lug having a beveled surface engageable by the wall of said notch when said sleeve is rotated in a direction opposite to that of the aforesaid rotation of the shaft for withdrawing said sleeve from said housing.

4. In combination with an apertured housing, a rotary shaft entering said housing; a member fixed to the inner end of said shaft by screw threads running in a direction to keep the member screwed home, a sleeve fitted on the shaft, washers abutting the ends of said sleeve, said sleeve and washers being clamped between the member and a shoulder on the shaft, a packing retainer comprising a sleeve removably mounted in said aperture, sealing rings fitted between the retainer sleeve and the walls of said aperture by which the retainer sleeve is centered in said aperture, said rings being embraced between opposing shoulders of the retainer sleeve and aperture and packing means between said first mentioned sleeve and retainer sleeve sealing the former in the latter, said retainer sleeve with its sealing means and retained packing means and first mentioned sleeve being insertible as a unit from inside the said housing.

5. In combination with an apertured casing provided with a removable front closure plate, a member rotating in said casing, the said member being insertible through the front opening of the casing when said closure plate is removed, a rotary shaft extending through a housing therefor in the rear wall of the casing, the said member being fixed on the fore end of said shaft by screw threads running in a direction to keep the member screwed home, a sleeve having a slip fit on the shaft, washers abutting the ends of said sleeve, said sleeve and washers being clamped between the member and a shoulder on said shaft, a packing retainer comprising a sleeve removably mounted in said housing, sealing rings fitted between the retainer sleeve and the walls of said aperture by which the retainer sleeve is centered in said aperture, said rings being embraced between opposing shoulders of the retainer sleeve and aperture and packing means between said first mentioned sleeve and retainer sleeve sealing the former in the latter, said retainer sleeve with its sealing means and retained packing means and said first mentioned sleeve being insertible as a unit from inside the casing into said housing and removable from and replaceable in said housing while the member is removed from said shaft.

6. In combination with a casing provided with a back closure plate, a rotary shaft extending into said casing through an aperture in said plate, a member fixed on the inner end of said shaft by screw threads running in a direction to keep the member screwed home, a sleeve having a slip fit on the shaft, washers abutting the ends of said sleeve, said sleeve and washers being clamped between the member and a shaft shoulder, a packing retainer comprising a sleeve removably mounted in said aperture, sealing rings fitted between the retainer sleeve and the walls of the aperture by which the retainer sleeve is centered in said aperture, said rings being embraced between opposing shoulders of the retainer sleeve and aperture, and packing means between said first mentioned sleeve and retainer sleeve sealing the former in the latter, said back plate with its contained parts being removable and said retainer sleeve with its sealing means and retained packing means and first mentioned sleeve being removable from and replaceable as a unit into said aperture from the inner side of said plate while the member is removed from said shaft.

7. In a shaft seal, a packing retainer comprising a sleeve which with retained packing is insertible endwise into an aperture in the shaft housing from the inner end of said housing, and sealing rings fitted between said sleeve and walls of the aperture, the sealing ring next said inner end of the housing being embraced between opposing shoulders of the sleeve and aperture, said sleeve having a head flange whereby action of liquid thereagainst constitutes the sole means for holding the sleeve in position to compress said embraced ring tightly between said opposing shoulders.

8. In a shaft seal, a packing retainer comprising a sleeve which with retained packing is insertible endwise into an aperture in the shaft housing from the inner end of said housing, and sealing rings fitted between said sleeve and the walls of the aperture and by which the sleeve is centered in said aperture, said rings being embraced between opposing shoulders of said sleeve and aperture and the sleeve being tapered to reduced diameter outwardly of each of said rings to facilitate its insertion.

9. In a rotary shaft seal, a packing retainer removably mounted and sealed in the shaft housing, said retainer with its retained packing being insertible and withdrawable endwise, means preventing rotation of said retainer in the direction of rotation of the shaft, and means whereby turning the retainer in the contrary direction will cause endwise movement thereof in the direction for its withdrawal.

HERBERT E. RUPP.